United States Patent [19]

Hennessy

[11] 4,410,311
[45] Oct. 18, 1983

[54] SELF-COOLING UNIVERSAL JOINT

[75] Inventor: Charles P. Hennessy, Glen Ellyn, Ill.
[73] Assignee: Lovejoy, Inc., Downers Grove, Ill.
[21] Appl. No.: 203,470
[22] Filed: Nov. 3, 1980
[51] Int. Cl.³ .......................... F16D 3/26; F16D 3/38
[52] U.S. Cl. ....................................... 464/17; 464/136
[58] Field of Search ............... 64/17 R, 17 A, 17 SP, 64/6, 21; 464/132, 134, 136, 17

[56] References Cited

U.S. PATENT DOCUMENTS

| | | | |
|---|---|---|---|
| 364,503 | 6/1887 | Fenner | 464/134 |
| 658,065 | 9/1900 | Jetter | 464/132 |
| 840,529 | 1/1907 | Turpin et al. | 464/132 |
| 2,839,903 | 6/1958 | Stillwagon, Jr. | 464/132 |
| 3,178,908 | 4/1965 | Stillwagon, Jr. | 464/132 |

OTHER PUBLICATIONS

Selected pages from the latest sales brochure from Lovejoy, Inc., of 2655 Wisconsin Avenue, Downers Grove, Illinois 60515, this latest sales brochure published about Mar. 1980.
Assembly Drawing and Parts List for Model D-10 Universal Joint manufactured by Lovejoy, Inc., drawing date is 9-26-73.

*Primary Examiner*—Stanley N. Gilreath
*Attorney, Agent, or Firm*—Fitch, Even, Tabin & Flannery

[57] ABSTRACT

A method and apparatus for increasing the life of universal joints of the pin and block type by reducing the running temperature of the pins and bearings to inhibit oxidation and vaporization of the lubricant film between those parts. The method and apparatus relate to conducting heat from the interior of the pin and bearing zone through heat transfer means and discharging that heat to the surrounding medium through heat dissipating means.

17 Claims, 13 Drawing Figures

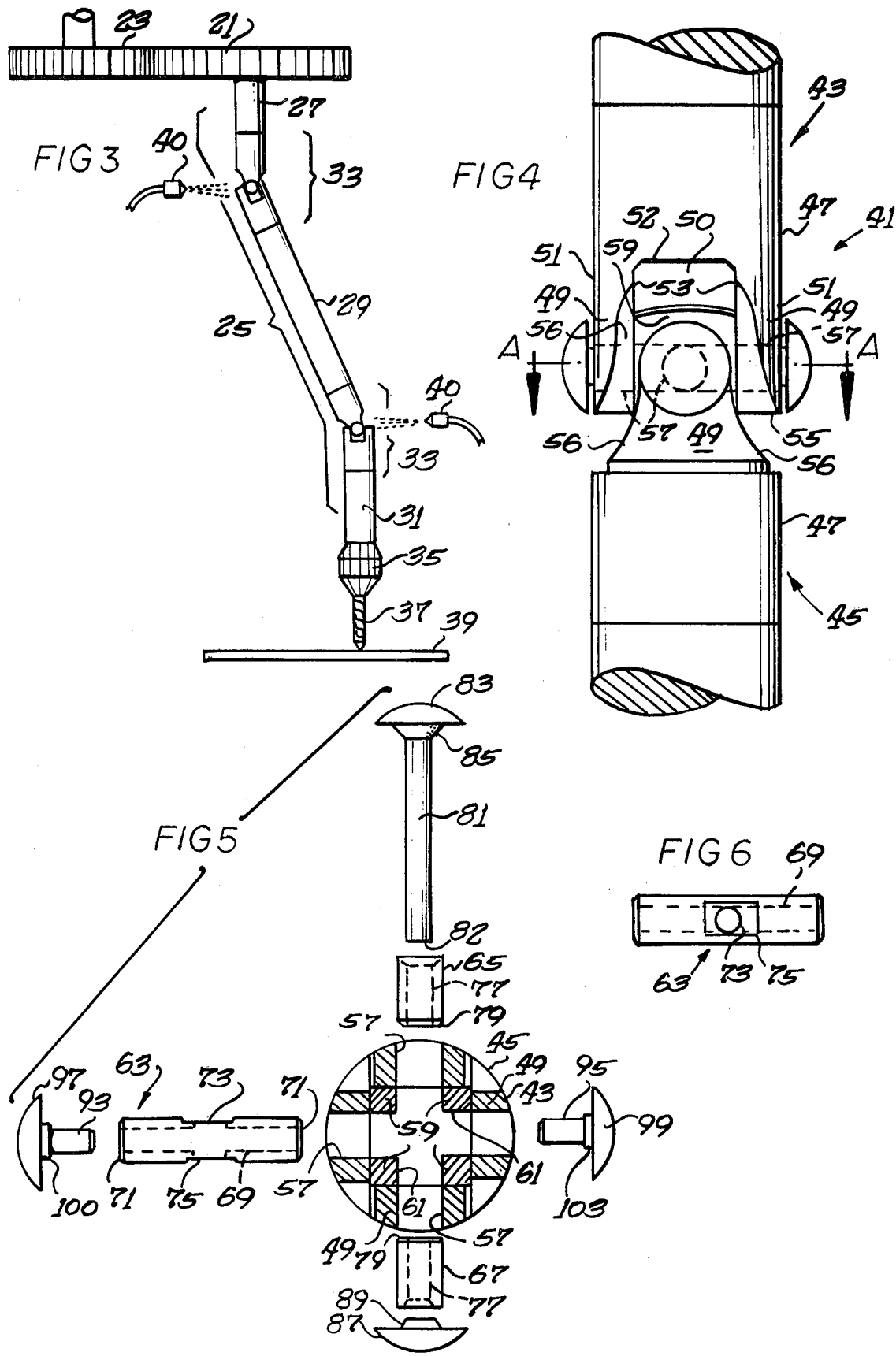

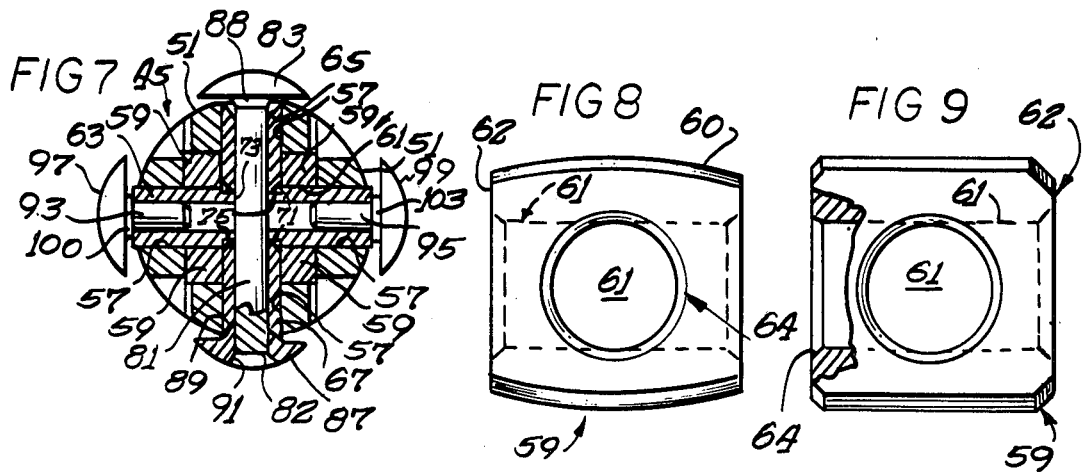
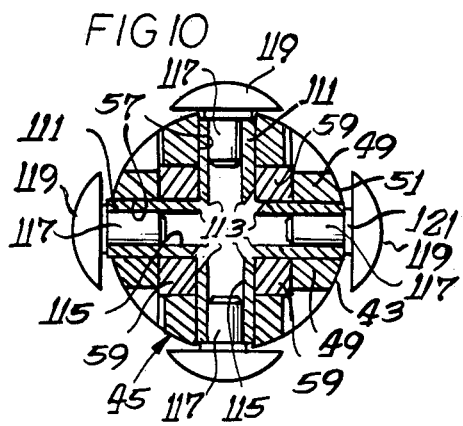
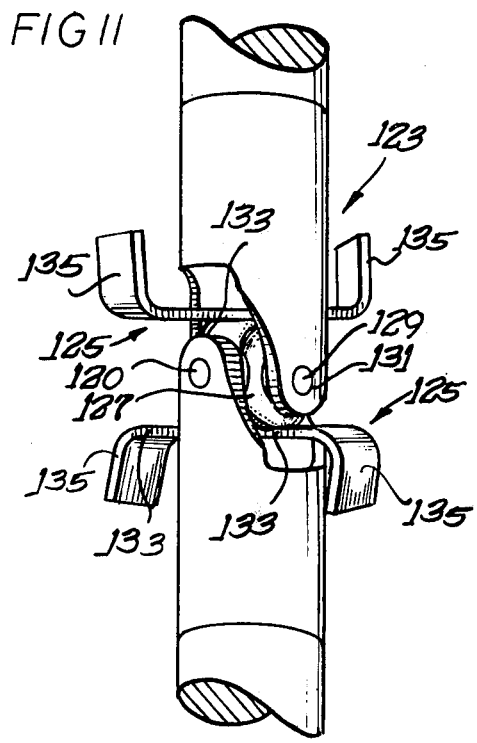
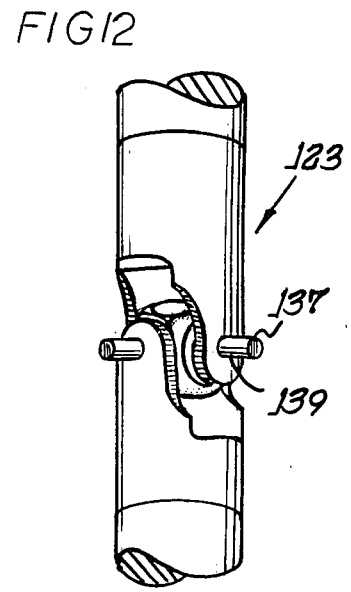
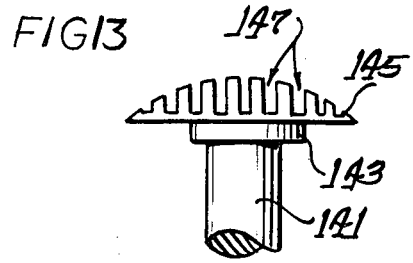

SELF-COOLING UNIVERSAL JOINT

BACKGROUND OF THE INVENTION

This invention relates generally to universal joints of the type having two yokes pivotally connected by means of pins to a center block.

Universal joints are used to transfer torque from a rotating input shaft to an output shaft when the centerlines of the two shafts are offset by some angle, called the offset angle. Universal joints of the pin and block type are often used for this purpose.

A universal joint of the pin and block type (hereinafter referred to as a universal joint) generally comprises two yokes, four pins, and a center block. Each yoke generally has a straight yoke shaft, often of circular cross section, having two ears at one end spaced 180 degrees apart. The ears of each yoke carry a bearing aligned on a common axis that is perpendicular to the centerline of the yoke shaft. The two yokes are displaced 180 degrees with their ears interleaved so that the axes through their respective bearings are oriented 90° apart and intersect the center block, which is positioned between the ears of the respective yokes. A pin inserted through each bearing and securely fastened to the center block allows each yoke to pivot about the axis of the pins, limited only by yoke to yoke contact. Input and output shafts may be connected to the free ends of the yoke shafts.

The construction of universal joints often varies depending on the severity of service conditions.

When universal joints are used in applications where they are subjected to relatively low torque and low rotational velocities, the yokes may be positioned such that the axes through their respective bearings do not lie in the same plane. This simplifies manufacture since the axes of the pins do not intersect and a single pin can be used to extend through the center block and the bearings in each pair of yoke ears. Since the load the pins must bear is low, they can be made from a soft material such as a low carbon steel so that the entire joint assembly can be maintained by simply riveting the ends of each pin. When the bearing axes are off-set as described above, operation of the universal joint results in articulation of the centerblock. However, at low rotational velocities like those encountered in hand operated applications such as remote control linkages in awning devices and snow blowers, articulation of the center block is usually inconsequential.

When universal joints are used in high torque and high speed applications, such as machine tool drive trains, other aspects of construction are considered. At high rotational velocities center block articulation would produce undesirable vibration. For this reason the universal joints are constructed so the bearing axes in the ears of the yokes lie in the same plane, intersecting at a 90 degree angle. Since the bearings and pins must have superior load-bearing capacity to endure the high torque levels, journal pins and journal bearings are almost exclusively used. They are typically made of steel, and are heat-treated to a hardness exceeding 40 Rockwell C.

To reduce friction and wear, a uniformly distributed lubricant film, such as an oil, is desirably maintained between the journal bearings and journal pins. In most journal pin and journal bearing applications, such as railroad axles, the shaft or pin rotates 360 degrees with respect to the bearing. This complete revolution helps to continually distribute lubricant between the pin and bearing surfaces. Operation of a universal joint, however, produces oscillatory angular displacement of the journal pins with respect to the journal bearings. The magnitude of the displacement is equal to twice the offset angle and since the offset angle seldom exceeds 25 degrees, the total displacement is usually limited to about 50 degrees. This oscillatory angular displacement of limited magnitude hampers lubricant distribution and produces increased surface contact between the journal pins and journal bearings. This metal to metal contact generates substantial amounts of frictional heat and increases the wear rate of the bearings and pins. Running temperatures in the pin and bearing zone often climb high enough to vaporize or oxidize substantially all the remaining lubricant causing the pins and bearings to quickly fail by wearing, scoring or seizing. The rate of frictional heat generation is related to the operating parameters of torque level, rotational velocity and offset angle.

Universal joints encounter particularly severe service conditions when used for mechanical linkage in multiple-spindle drill head machines. Multiple-spindle drill head machines have a number of spindles driven off the same gear in the same head. Torque from the drive gear is transmitted to each spindle through an intermediate shaft having universal joint connections at both ends. Torque levels on the universal joints vary depending on the working stock and the operation performed. It is not uncommon however, for torque levels to intermittently surge. This happens when the tool "bites" the working stock as often occurs near the end of a drilling cycle as the bit breaks through the stock. Typical rotational velocities are about 1800 r.p.m., but may be as high as 2500 r.p.m. Under normal circumstances these universal joints must be replaced every three to four months and usually because of a failure related to lack of lubrication. When extremely high levels of torque are encountered, the universal joints may have to replaced as often as weekly.

Various attempts have been made to extend the life of universal joints employed in high speed and high torque applications and especially in multiple-spindle drill head machines. It is known that lubricant circulation is facilitated by maintaining dimensional tolerances on the order of 0.0002 inch on the outside diameter of the journal pin and the inside diameter of the journal bearing. Such precision machining is, however, very costly. To continually replenish the lubricant film in the universal joint, the entire universal joint is sometimes encased in a flexible boot that is filled with lubricant, but this is expensive and adds considerably to the diameter of the universal joint. Hence, where the working space is small as in a multiple-spindle drill head, it is not practical to use such large diameter universal joints encased within a lubricant-filled boot. Further, breakage of the boot and leakage of the lubricant is possible. Many multiple-spindle drill head machines have a forced spray of lubricant directed at the universal joint in the vicinity of the journal bearings. This has proved marginally successful, but high running temperatures still result in the loss of the lubricant film between the journal pins and journal bearings.

BRIEF SUMMARY OF THE INVENTION

Past attempts to extend the life of universal joints employed in high speed and high torque applications have been directed toward replenishing or improving the distribution of the lubricant film between the pins and bearings.

Since the loss of the lubricant film is primarily due to the excessive running temperature of those parts, it is a primary object of the invention to provide a method and apparatus to reduce that running temperature.

It is another object of the invention to reduce the running temperature of the pins and bearings by conducting heat from the interior of the pin and bearing zone to the exterior of the universal joint through heat transfer means and to discharge that heat from the universal joint through heat dissipating means.

These and other objects will become apparent to those skilled in the art from the following description, drawings and appended claims.

DESCRIPTION OF THE DRAWINGS

FIG. 3 is a schematic representation of the use of a universal joint in a multiple-spindle drill head machine.

FIG. 4 is a front view of a universal joint showing one illustrated embodiment of the invention.

FIG. 5 is an exploded, cross-sectional view of FIG. 4 taken along line A—A. To better illustrate the geometry of the various parts, only the yoke ears and center block are shown in cross section.

FIG. 6 is a front view of one of the journal pins shown in FIG. 5.

FIG. 7 is an assembled view of FIG. 5, with the journal pins also shown in cross-section.

FIG. 8 is a front view of the center block shown in FIGS. 4, 5, and 7.

FIG. 9 is a side view of the center block shown in FIG. 8.

FIG. 10 is a view similar to FIG. 7 showing a second illustrated embodiment of the invention.

FIG. 11 is a perspective view of a universal joint showing a third illustrated embodiment of the invention.

FIG. 12 is a perspective view of a universal joint showing a fourth illustrated embodiment of the invention.

FIG. 13 shows a fifth illustrated embodiment of the invention.

DETAILED DESCRIPTION OF THE INVENTION

Figure 1:
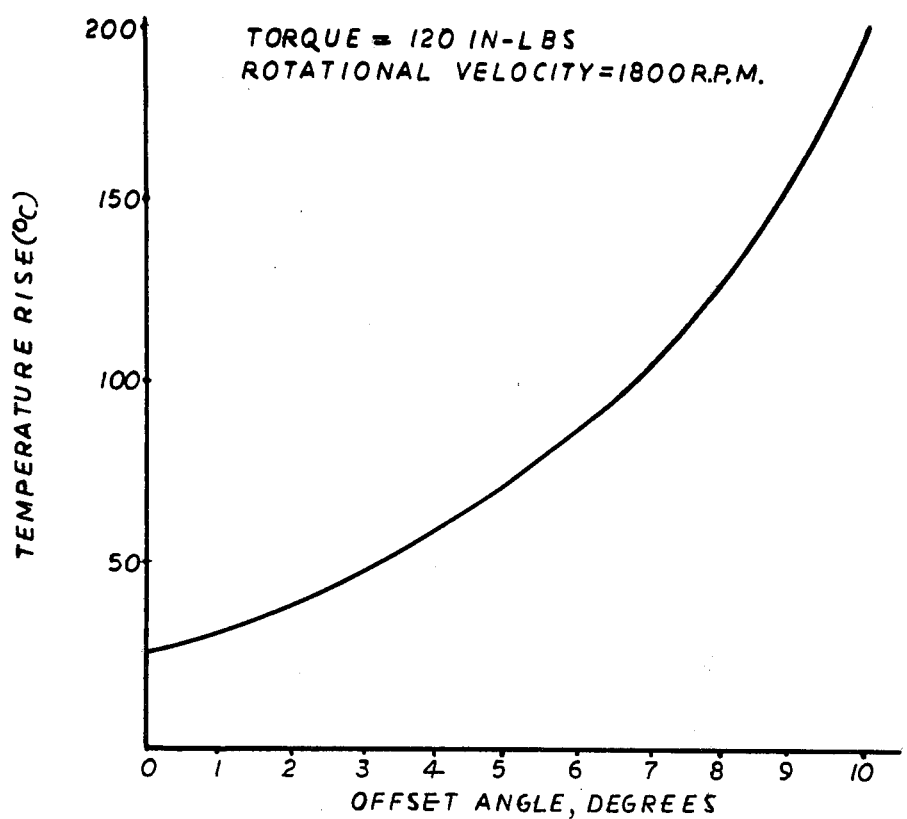
FIG. 1 is a graph showing the steady-state running temperature rise from ambient, in degrees C., in the journal pin and journal bearing zone as a function of the offset angle in a typical universal joint operated at constant torque and rotational velocity.
Figure 2:
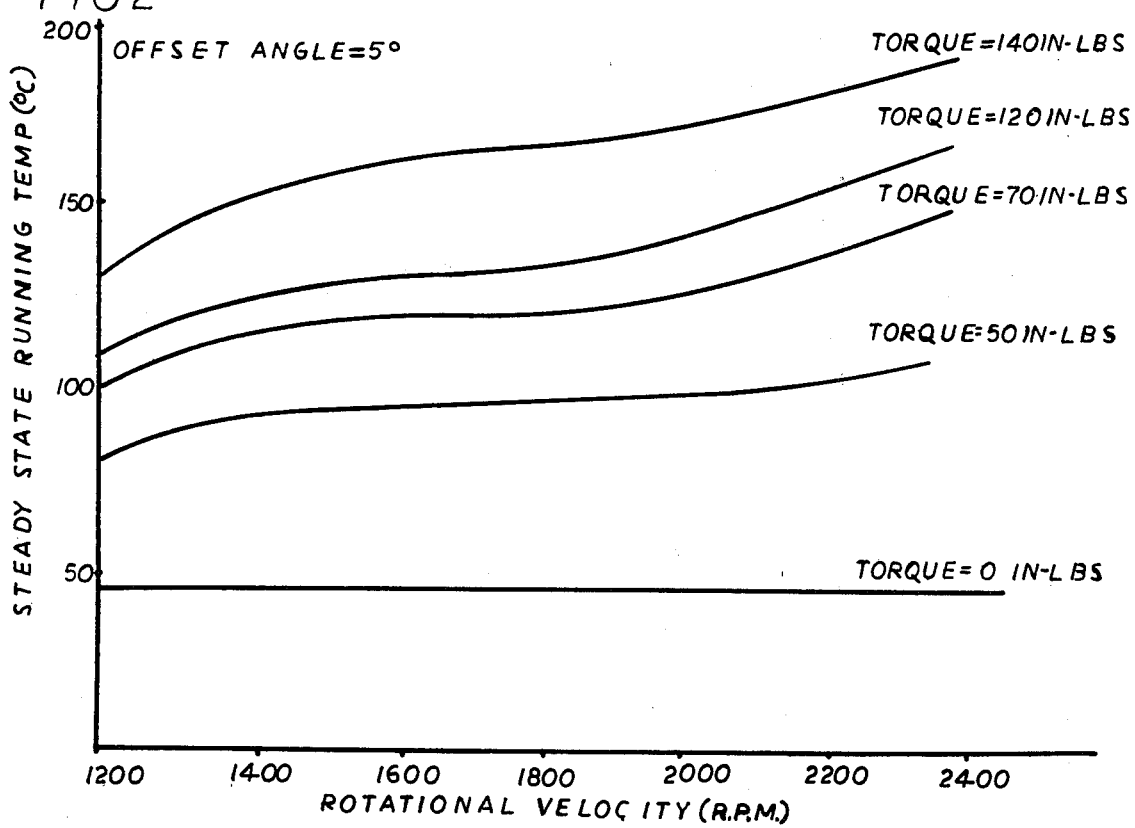
FIG. 2 is a graph of the steady state running temperature, in degrees C., in the journal pin and journal bearing zone as a function of rotational velocity in a typical universal joint, operated at a constant offset angle of 5 degrees and five different torque levels.

FIGS. 1 and 2 illustrate the effect of torque, offset angle and rotational velocity on the steady-state running temperature in the journal pin and journal bearing zone of a typical universal joint operating in an air medium. An infra red camera directed at the journal pin and journal bearing zone was used to measure the steady-state operating temperatures of that zone.

Referring to FIG. 1 it can be see that at constant torque and rotational velocity the temperature rise from ambient in the journal pin and journal bearing zone increases rapidly with increasing offset angle. At an offset angle of 10 degrees and a rotational velocity of 1800 r.p.m. the temperature rise may be as much as 200 degrees C. While testing was not carried out at higher offset angles, this graph clearly indicates operating temperatures in the journal pin and journal bearing zone can easily climb to levels well above the flash point for many organic lubricants.

As can be understood from FIG. 2, the steady state operating temperature in the journal pin and journal bearing zone increases with increasing rotational velocity as well as torque. In FIG. 2, the offset angle was held at a constant 5 degrees.

FIG. 3 is a schematic representation of the use of universal joints in a multiple-spindle drill head machine. A spindle gear 21 is driven from a main drive gear 23. While only one spindle 25 is shown in this drawing, there are usually several such spindles arranged in an arc about the main drive gear 23. The spindle 25 has a drive shaft 27, an intermediate connecting shaft 29 and an output shaft 31. Two universal joints 33 and the intermediate connecting shaft 29 provide mechanical linkage to transmit torque from the drive shaft 27 to the output shaft 31. The output shaft 31 typically has a chuck 35 for holding a tool 37 to perform some operation on the workpiece 39. Two nozzles 40 continually spray lubricant at the journal pin and journal bearing zone in the universal joints 33.

A generally large offset angle exists between the intermediate connecting shaft 29 and the drive and output shafts 27 and 31 respectively. It is not uncommon for this offset angle to be as great as 22.5 degrees. As mentioned above the rotational velocity of the spindle is typically about 1800 r.p.m. and while torque levels may vary, a load of 120 in.-lbs. would not be uncommon. Referring again to FIGS. 1 and 2, it is evident that over prolonged periods many lubricants may not withstand the temperatures reached in the journal pins and journal bearing zone. While the spray of lubricant from the nozzles 40 provides some cooling, these universal joints still usually fail due to the oxidation and vaporization of the lubricant film between the journal pins and journal bearings.

In an illustrated embodiment of the invention (FIG. 4) a universal joint 41 is constructed having two substantially identical yokes 43 and 45. Each yoke comprises a straight yoke shaft 47 of circular cross section, having two diametrically opposed ears 49 at one end. The yoke ears define an opening 50 therebetween into which is inserted the ears of the opposite yoke. The ends of the yoke shafts 47 may be provieed with a means (not shown) for fastening the yokes to rotary input or output shafts.

In a known manner, each ear may have an outer curved surface 51 which may coincide with the cylindrical surface of its yoke shaft and an internal flat inside surface 53 opposite the curved surface 51, the latter extending from an internal end wall 52 of the yoke's opening 50 to an outer end wall 55 of the ear. Often, the end wall 55 is semi-circular and blends into curved sidewalls 56.

The ears 49 in each yoke are apertured to form aligned journal bearings 57. The journal bearings 57 are disposed about a common axis that is perpendicular to the centerline of the respective yoke shaft 47.

Yokes 43 and 45 are positioned such that their ears 49 are opposing and the axes through their respective journal bearings 57 intersect at right angles.

A center block 59, is located between the ears 49 of yokes 43 and 45 (FIGS. 4, 5, and 7). Its general shape is that of a cube having a curved surface 60 on its top and bottom faces (FIGS. 8 and 9). The center block 59 has two cylindrical receiving bores 61 perpendicular to its flat faces 62. The centerlines of the receiving bores 61 intersect at right angles. A small groove 64 in the flat faces 62 of the center block 59, disposed about the receiving channel 61, maintains an oil meniscus to aid lubricant distribution to the journal bearings 57.

The center block 59 is so positioned that the center lines of the two receiving bores 61 are each aligned with the axis of one pair of journal bearings 57 (FIG. 5). Enough clearance is provided between the center block 59 and the inside surfaces 53 of ears 49 to allow the block to move rotatably about the center line of either pair of journal bearings 57.

Three journal pins 63, 65 and 67 are provided for connecting the yokes 43 and 45 to the center block 59 (FIGS. 5, 6 and 7).

The preferred shape for journal pin 63 is a cylinder (FIGS. 5 and 6) having: a cylindrical hollow center 69, evenly disposed about the entire longitudinal axis of the pin; a chamfered edge 71 at both ends; two circular openings 73, positioned such that their centers lie along a line that is perpendicular to and intersects the longitudinal axis of pin 63 at the midpoint; and two parallel flats 75, rectangular in shape and recessed on the outside surface of the pin, each flat 75 being centered about one of the circular openings 73.

As seen in FIG. 5, the preferred journal pins 65 and 67 are substantially identical. Each comprises a cylinder having: a cylindrical hollow center 77 evenly disposed about the entire longitudinal axis of the pin and being flared at one end; and an exterior chamfered edge 79 at the end opposite the flared end of the hollow center 77.

When yokes 43 and 45 and the center block 59 are positioned as previously described and shown in FIGS. 4, 5 and 7, it can be seen that two continuous channels are formed by the journal bearings 57 in the ears 49 of yokes 43 and 45 and receiving bores 61 of the center block 59. Journal pin 63 is inserted into the channel that is continuous with the journal bearings 57 of yoke 43. Since the diametral clearance between the journal bearings and journal pins is typically 0.0010 to 0.0015 inches, insertion is facilitated by chamfered edges 71. Journal pin 63 is positioned such that each journal bearing 57 of yoke 43 is disposed about one end of the pin 63 (FIG. 7). In this fashion each end of journal pin 63 can function independently. The line connecting the centers of the circular openings 73 in journal pin 63 is aligned to be colinear with the axis of the journal bearings 57 in yoke 45. Journal pins 65 and 67 are each inserted into a journal bearing 57 of yoke 45 and the receiving bore 61 of the center block 59 (FIGS. 5 and 7). The end of each journal pin 65 and 67, having the chamfered edge 79, is butted against one of the rectangular flats 75 of journal pin 63.

In accordance with the present invention, the operating temperature in the journal pin and journal bearing zone is reduced from that of conventional universal joints by heat transfer means used to transfer heat from the journal pin and journal bearing zone to heat dissipating means located exteriorly of the surface of the universal joint to discharge the heat from the universal joint. Herein, the heat transfer means comprises cylindrical heat transfer cores 81, 93 and 95, and the heat dissipating means comprises plano-convex heat dissipating caps 83, 87, 97 and 99. Heat transfer core 81 has a free end 82 that is inserted through the hollow center 77 of journal pin 65, both circular openings 73 in journal pin 63, and the hollow center 77 of journal pin 67 (FIGS. 5 and 7). Heat dissipating cap 83, located at the opposite end of heat transfer core 81, has a tapered shoulder 85 that only partially fits into the flared end of the hollow center 77 of journal pin 65. The diameter of heat transfer core 81 is made large enough to ensure contact between its surface and the interior surface of the hollow centers 77 of journal pins 65 and 67. Heat dissipating cap 87 is affixed to the free end 82 of heat transfer core 81. Heat dissipating cap 87 has a shoulder 89 and a hollow center 91 that is flared at the end nearest the convex surface (see breakaway view in FIG. 7). Part of the shoulder 89 fits into the flared end of the hollow center 77 of journal pin 67. The free end 82 of heat transfer core 81 fits into the hollow center 91 of heat dissipating cap 87. Heat transfer core 81 can be made long enough to protrude into the flared section of the hollow center 91 of heat dissipating cap 87. Heat dissipating cap 87 may then be affixed to the heat transfer core 81 by deforming the free end 82 of the core. Other means such as adhesives or screw fasteners may also be used. Once heat dissipating cap 87 is secured to the heat transfer core 81, journal pins 63, 65 and 67 are locked into position (FIG. 7).

As mentioned above, the heat transfer means also includes, two shorter, cylindrical, heat transfer cores 93 and 95 which are inserted into the ends of the hollow center 69 of journal pin 63. Fastened to heat transfer cores 93 and 95 are, respectively, plano-convex heat dissipating caps 97 and 99 and square shoulders 100 and 103. Like the tapered shoulders 85 and 89 on heat dissipating caps 83 and 87, shoulders 100 and 103 provide spacing between the heat dissipating caps and the outer curved surface 51 of the ears 49. The heat transfer cores 93 and 95 have outside diameters that are tapered to allow them to be press-fitted into the hollow center 69 of journal pin 63 thus ensuring intimate surface contact between the two parts.

Accordingly, when the universal joint 41 of the present invention is operated, frictional forces between the journal pins 63, 65 and 67 and the journal bearings 57 generate heat, thereby raising the temperature of the journal pin and journal bearing zones. While some of the heat generated will be dissipated directly to the air from the pins and bearings, and some will flow into and be dissipated to the air by yokes 43 and 45 and the center block 59, a substantial portion may be conducted to the heat dissipating caps 83, 87, 97 and 99 via the heat transfer cores 81, 93 and 95. Intimate contact between the exterior surfaces of heat transfer cores 81, 93 and 95 and the surfaces provided by the hollow centers 69 and 77 of the journal pins 63, 65 and 67 allows heat to flow across the pin-heat transfer core interface. This heat is then conducted to the relatively cool heat dissipating caps 83, 87, 97 and 99. The heat dissipating caps have large exterior surface areas to discharge heat, and are located exteriorly of the universal joints 41 to provide turbulence to the ambient air as the universal joint is operated. As the temperature of the heat dissipating caps rises above ambient, heat naturally flows across the heat dissipating cap surface and air interface. By augmenting the heat flowing away from the journal pin and journal bearing zone and dissipating the heat to the ambient atmosphere, lower operating temperatures are achieved.

Operation of the universal joint 41 entails rotation of the yokes 43 and 45 about the center line of their yoke shafts 47 so the air flow about the heat dissipating caps 83, 87, 97 and 99 is related to the rotational velocity of the yokes. While higher rotational velocity of the universal joint 41 results in greater heat generation in the journal pin and journal bearing zone (FIG. 2), the removal of the heat is facilitated by the increased air flow about the heat dissipating caps. Heat flow across the heat dissipating cap surface and air interface is also related to the surface area of that interface. For this reason, the convex portions of the heat dissipating caps 83, 87, 97 and 99 have a large radius and the above-mentioned shoulders 85, 89, 100 and 103 permit air flow across the planar surface of the caps. The total diameter of the universal joint with the heat dissipating caps is small compared to the previously mentioned lubricant-filled boot. Also, no sharp rotating edges are present that could injure a worker.

Accordingly, the operating temperature of the journal bearings 57 and the journal pins 63, 65 and 67 has been found to be lower and the life of the joint increased because the lubricant film between these parts is not oxidized or vaporized as readily as in conventional universal joints.

The rate of oxidation and vaporization of the lubricant film is a function of time, temperature and the type of lubricant used. As previously mentioned and shown in FIG. 3, universal joint used in high speed and high torque applications are often lubricated with an oil spray. Synthetic oils as well as petroleum distillates are mainly comprised of hydrocarbons. These hydrocarbons are subject to oxidation by what is termed a free-radical mechanism. While antioxidants may be used to inhibit this reaction mechanism, the rate of oxidation remains a function of lubricant temperature and is substantial at the temperatures normally reached in the journal pin and journal bearing zone. Oxidation of the lubricant is almost always an exothermic reaction and therefore the heat of oxidation tends to further increase the rate of oxidation. If the heat of oxidation cannot be dissipated rapidly enough, combustion of the lubricant may occur. Exposure of the lubricant to high temperatures (in excess of about 300 degrees C.) usually leads to rapid degradation or cracking of the polymer chains (pyrolysis). Cracking is also a free-radical mechanism and is also accelerated by oxidation. As the long chain hydrocarbons are broken down through oxidation and pyrolysis they form volatile short chain compounds. These compounds are readily driven off as vapor and the lubricant film between the journal pins and journal bearings is thereby depleted.

If the temperature of the journal pins and journal bearings is high enough, the rate of depletion will exceed the rate of replenishment of the lubricant film between those parts. This will occur whether lubricant replenishment is continuous, as in the case of a spray, or only periodic. If the universal joint is operated for a period of time long enough to allow substantially complete depletion of the lubricant film, the journal pins and journal bearings will fail by scoring, seizing or excessive wear. That temperature at which the lubricant film would be completely depleted within the period of time of a normal operating cycle of the universal joint is referred to herein as the depletion temperature of the lubricant. In accordance with the present invention, heat transfer means and heat dissipating means are used to maintain the temperature of the journal pin and journal bearing zone below the depletion temperature of the lubricant. Preferably, the journal pin and journal bearing zone will operate in the range of 70–80 degrees C.

The operating temperature reached is a function of the thermal conductivity of the heat transfer cores 81, 93 and 95 and the heat dissipating caps 83, 87, 97 and 99. In accordance with this invention a path of relatively low resistance for enhanced heat flow is achieved by fabricating the heat transfer cores and heat dissipating caps from materials having high thermal conductivity (K). The yokes 43 and 45, the center block 59, and the journal pins 63, 65 and 67 are generally made of steel (K approximately equal to 0.11 cal./cm$^2$/cm./°C./sec.). In the embodiment illustrated in FIGS. 4 thru 7 of the present invention, brass (K approximately equal to 0.30 cal./cm$^2$/cm/°C./sec.) heat transfer cores 81, 93 and 95 and heat dissipating caps 83, 87, 97 and 99 are used. While brass is an excellent heat conductor, it is also a very ductile metal. It is therefore particularly well suited for the riveting and press-fitting used to secure the heat transfer cores and heat dissipating caps. Other materials, such as other metal alloys or epoxies impregnated with metal filings, may be used to fabricate the heat transfer cores and heat dissipating caps. While the mechanical properties of the chosen material are important, sufficient thermal conductivity is, of course, a primary concern.

The use of heat transfer cores and heat dissipating caps results in substantially lower operating temperatures in the journal pin and journal bearing zone. A universal joint similar to that shown in FIG. 4, having an overall length of about 4¼ inches and a yoke shaft diameter of about 1½ inches was operated with and without brass heat transfer cores and heat dissipating caps. The universal joint was rotated at 2200 r.p.m. with 100 inch-lbs. torque and an offset angle of 5°. The use of the heat transfer cores and the heat dissipating caps reduced the steady-state running temperature of the journal pin and journal bearing zone by about 20° C.

FIG. 10 shows a second illustrated embodiment of the present invention. Four substantially identical journal pins 111 have been inserted through the journal bearings 57 of yokes 43 and 45 and press-fitted into the center block 59. The journal pins 111 have chamfered edges 113 (to facilitate insertion into the center block 59) and hollow centers 115 to receive heat transfer cores 117. All heat transfer cores 117 have been press-fitted into the hollow centers 115 of the journal pins 111. Each heat transfer core 117 has a plano-convex heat dissipating cap 119 at one end that is spaced apart from the outer curved surface 51 of the ears 49 by a shoulder 121. As FIG. 10 shows, it is not necessary that the heat transfer cores 117 penetrate the center block 59.

As illustrated by FIGS. 4 through 10 heat transfer means in the form of heat transfer cores may be provided to conduct heat from the interior of the journal pin and bearing zone to the exterior of the universal joint. Similarly heat dissipating means, used to discharge the heat conducted by the heat transfer cores, may be provided in the form of plano-convex heat dissipating caps. The following description of FIGS. 11 through 13 shows that the heat transfer means and heat dissipating means may be formed in various manners and still fall within the purview of the invention.

Referring to FIG. 11 it can be seen that in a third illustrated embodiment of the invention a conventional universal joint 123 has been provided with two sets of swept back fins 125 that have been fastened to and are in thermal communication with the centerblock 127. Operation of the universal joint 123 will cause frictional heat to be generated between the journal pins 129 and the journal bearings 131. In this embodiment the journal pins 129, the center block 127 and the interior portion 133 of the swept back fins 125 function as heat transfer means. These members conduct a substantial amount of the frictional heat from the interior of the journal pin and journal bearing zone to the heat dissipating surfaces provided by the exterior portion 135 of the swept back fins 125. This construction allows for very efficient heat discharge to the surrounding medium so that a substantial reduction in operating temperature in the journal pin and journal bearing zone may be achieved. However, it presents sharp shoulders which, when rotating, could injure a worker.

Referring now to FIG. 12, in a fourth illustrated embodiment of the invention a conventional universal joint 123 similar to that shown in FIG. 11 has been provided with extended journal pins 139. In this embodiment the extended journal pins 139 function as both heat transfer means and heat dissipating means. A substantial portion of the frictional heat developed in the interior journal pin and journal bearing zone is conducted by the journal pin 139 to the exterior of the universal joint where it is discharged to the surrounding medium through the heat dissipating surface 137 of the journal pin 139. For greater efficiency the extended journal pin 139 may be provided with a hollow center and a heat transfer core similar to those discussed in reference to FIGS. 4 through 7 and 10. The longer pins 139 however, increase the diameter of the joint and present rotating surfaces which could injure a worker. The long pins create good air turbulence for heat transfer from the pins to the ambient atmosphere.

FIG. 13 illustrates a fifth embodiment of the invention. The universal joint itself has been omitted and only a portion of the journal pin 141 with a shoulder 143 and a grooved heat dissipating cap 145 are shown. The heat conductive properties of journal pin 141 allow it to function as the heat transfer means, i.e. to conduct heat to the plano-convex heat dissipating cap 145 which would be located on the outside of the universal joint in a position corresponding to the heat dissipating caps shown in FIGS. 4, 5, 7 and 10. In this embodiment the solid journal pin 141 may simply be press-fitted into the center block of the universal joint. To help compensate for the lack of a high thermal conductivity heat transfer core, the surface area of the heat dissipating means has been increased by providing the heat dissipating cap 145 with a plurality of grooves 147.

All of the above-described apparatus are used to extend the useable life of universal joints. As mentioned, universal joint failure is often due to a lack of lubrication between the journal pins and journal bearings. A method is employed that inhibits the loss of that lubricant. As illustrated by all the embodiments shown herein, loss of the lubricant is inhibited by reducing the running temperature in the journal pin and journal bearing zone. This reduction in running temperature is accomplished by conducting heat from the interior of the journal pin and journal bearing zone to the exterior of the outside surface of the universal joint by heat transfer means where it is discharged by heat dissipating means. Continually "pumping" heat from the journal pin and journal bearing zone in this fashion helps to keep the running temperature below the lubricant depletion temperature.

From the foregoing it should be appreciated that a novel method and several apparatus have been described for extending the life of universal joints. The method and apparatus relate to means for reducing the running temperature of the pin and bearing zone in those universal joints to inhibit oxidation and vaporization of the lubricant film between the pins and bearings, while past attempts have been directed toward aiding the distribution and replenishment of this lubricant film. Also, the rate of temperature rise for the joint is reduced with this invention.

Various configurations of and the materials comprising the heat transfer means and heat dissipating means can be employed, depending on the degree of cooling necessary for the given lubricant and operating parameters of rotational velocity, torque level and offset angle.

It should be understood that although some embodiments of the present invention have been described and illustrated, various modifications may become apparent to those skilled in the art and, accordingly, the scope of the present invention should be defined only by the appended claims and equivalents thereof.

Various features of the invention are set forth in the following claims.

What is claimed is:

1. In a universal joint of the pin and block type having two yokes each of which has two diametrically opposed yoke ears defining axially aligned journal bearings therein, and journal pins disposed within said journal bearings and pivotally connecting said yokes to said block so as to enable relative pivotal movement between said block and said yokes, the improvement wherein at least one of said journal pins has a hollow center, a heat transfer core disposed within said hollow center in thermal communication with the corresponding journal pin, and a heat dissipating cap formed on said heat transfer core so as to be disposed externally of the outside surface of the corresponding yoke, said heat dissipating cap including means operative to maintain said cap spaced from the outer surface of the corresponding yoke so that heat created within said at least one journal pin is conducted by said heat transfer core to said heat dissipating cap and dissipated to atmosphere in a manner to reduce the operating temperature of said universal joint.

2. A universal joint in accordance with claim 1 wherein said universal joint includes a lubricant between said journal end and said journal bearings, and wherein said heat transfer core and said heat dissipating cap are adapted to reduce and maintain the temperature of said journal bearings and said journal pins below the depletion temperature of said lubricant.

3. A universal joint in accordance with claim 1 wherein said heat dissipating cap is in the form of a plano-convex cap.

4. A universal joint in accordance with claim 3 wherein said plane-convex cap has a plurality of grooves in its convex surface.

5. A universal joint in accordance with claim 1 wherein said heat dissipating cap is fabricated from brass.

6. A universal joint in accordance with claim 1 wherein said heat transfer core is fabricated from brass.

7. A universal joint in accordance with claim 1 wherein said heat transfer core is fabricated from a material having higher thermal conductivity than the material from which said journal pins and journal bearings are fabricated.

8. A universal joint in accordance with claim 1 wherein said heat dissipating cap is fabricated from a material having higher thermal conductivity than the material from which said journal pins and journal bearings are fabricated.

9. A universal joint in accordance with claim 1 wherein said heat transfer core and said heat dissipating cap are in the form of an extended journal pin.

10. In a universal joint of the pin and block type having yokes pivotally connected to said block by means of journal pins and journal bearings, the combination comprising;

a hollow center in at least one of said journal pins, a heat transfer core inserted into said hollow center, said heat transfer core being fabricated from a material having a higher thermal conductivity than the material from which the corresponding journal pin is fabricated, said heat transfer core being in thermal communication with said corresponding journal pin, and a heat dissipating cap in thermal communication with said heat transfer core, said heat dissipating cap being fabricated from a material having higher thermal conductivity than the material from which said corresponding journal pin is fabricated, said heat dissipating cap including means operative to maintain said cap spaced from the outer surface of the corresponding yoke so that heat created within said at least one journal pin is conducted by said heat transfer core to said heat dissipating cap and dissipated to atmosphere.

11. A universal joint in accordance with claim 10 wherein said heat transfer core is fabricated from brass.

12. A universal joint in accordance with claim 10 wherein said heat dissipating cap is fabricated from brass.

13. A universal joint in accordance with claim 10 wherein said heat dissipating cap has a plurality of grooves.

14. A universal joint in accordance with claim 10 wherein the shape of said heat dissipating cap is plano-convex.

15. A universal joint in accordance with claim 10 wherein said heat dissipating cap and said heat transfer core are formed integral, said heat transfer core being secured to said at least one journal pin by a press-fit.

16. A universal joint in accordance with claim 10 wherein said heat dissipating cap is secured to said universal joint by riveting.

17. A universal joint as defined in claim 10 wherein said joint includes two yokes each of which has two substantially diametrically opposed yoke ears defining axially aligned journal bearings therein, a hollow center journal pin disposed within each of said journal bearings and cooperative with said block to enable relative pivotal movement between said block and said yokes, and including a heat transfer core disposed within the hollow center of each of said journal bearings and having a cap defining a plano-convex heat transfer surface spaced outwardly from its associated yoke.

* * * * *